Dec. 29, 1925.
L. W. STAUGHTON
1,567,628
RELIEF VALVE OPERATING DEVICE FOR PRESSURE TANKS
Filed March 29, 1922
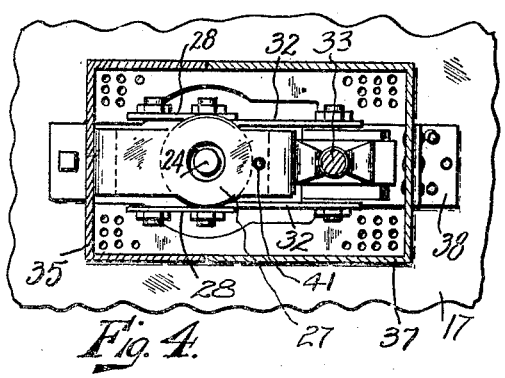
Fig. 4.
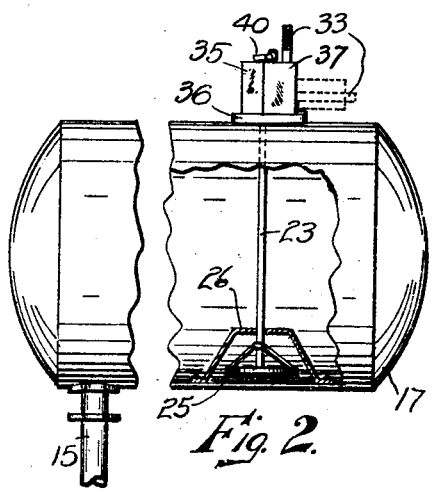
Fig. 2.
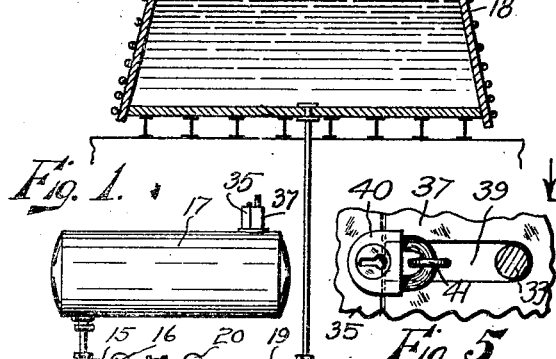
Fig. 1.   Fig. 5.
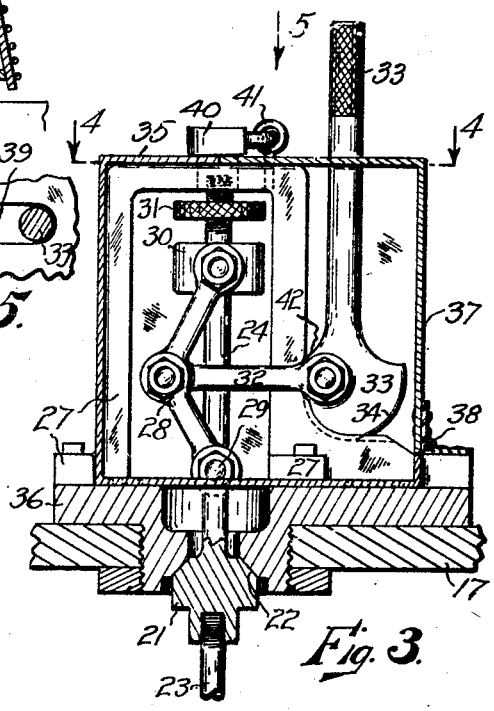
Fig. 3.
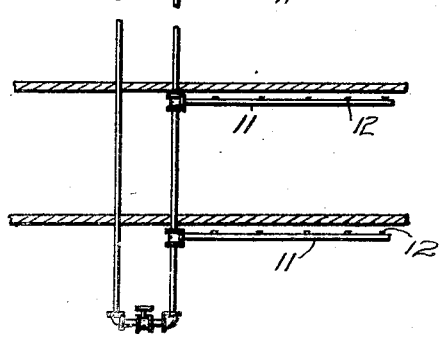
Inventor
L. W. Staughton.
By Attorneys
Southgate & Southgate Patented Dec. 29, 1925.

1,567,628

UNITED STATES PATENT OFFICE.

LANCE W. STAUGHTON, OF NEW DORP, NEW YORK, ASSIGNOR TO ROCKWOOD SPRINKLER COMPANY OF MASSACHUSETTS, A CORPORATION OF MASSACHUSETTS.

RELIEF-VALVE-OPERATING DEVICE FOR PRESSURE TANKS.

Application filed March 29, 1922. Serial No. 547,821.

*To all whom it may concern:*

Be it known that I, LANCE W. STAUGHTON, a citizen of the Commonwealth of Australia, residing at New Dorp, in the county of Richmond and State of New York, have invented a new and useful Relief-Valve-Operating Device for Pressure Tanks, of which the following is a specification.

This invention relates to the storage of water for supplying sprinkler systems in tall buildings and other structures, and to a safety device therefor.

The principal objects of the invention are to provide means whereby the common fault of such systems, namely the failure to supply water to the upper floors under certain contingencies will be eliminated; to provide a pressure relief valve for the air pressure tank which will automatically open that tank to the outer air just before it is completely emptied and thus neutralize its air pressure, thereby avoiding the interference of the pressure in that tank with the opening of the check valve in the discharge pipe from the gravity tank; to provide a simple and practical means for closing said pressure relief valve and setting it so that it cannot be tampered with and yet so that it can be opened by the automatic operating device above mentioned; and to provide a sealing arrangement therefor. Further objects and advantages of the invention will appear hereinafter.

Reference is to be had to the accompanying drawings, in which—

Fig. 1 is a diagrammatic view of a sprinkler system used in a tall building and of the usual type, but provided with a preferred form of this invention;

Fig. 2 is a side view on enlarged scale of the pressure tank thereof with parts shown in section;

Fig. 3 is a further enlarged sectional view of the relief valve and connected parts showing the operating mechanism in elevation;

Fig. 4 is a section on the line 4—4 of Fig. 3; and

Fig. 5 is a plan of the casing.

It is customary to provide sprinkler systems for tall buildings with a distributing pipe 10 feeding the various branch pipes 11 with which the sprinkler heads 12 are connected and to feed this distributing pipe through a supply pipe 13 extending down from the roof of the building to the basement where there are the valves or other regulating devices that may be required. This supply pipe 13 is supplied with water under pressure from a branch 15 at the top of the building and connected through a check valve 16 with a pressure tank 17 in which water is maintained under air pressure, a volume of air being maintained above it to force the water out under high pressure whenever one of the sprinkler heads opens. This pressure tank is not ordinarily depended upon for the entire supply of water, but is used to give the first supply to the system under considerable pressure. In addition to this a gravity tank 18 containing a much larger supply of water and providing the main supply for the extinguishment of a large fire is connected with the supply pipe 13 by a branch 19 through a check valve 20. These features just described are in common use. The reason for having a small part of the water supply under a high air pressure is that an ample flow of water from the sprinkler at the very start of a fire is generally sufficient to extinguish it forthwith. If not, and if a hot and extended fire results, opening many heads and requiring a larger supply of water to extinguish it than is contained in the relatively small, because costly, pressure tank 17, then water from the gravity tank 18 lifts the check valve 20 against the pressure of water from the pressure tank—now much reduced by the expansion of the original volume of air—and flows to the system.

It has been discovered in practice that a sufficient head of water in the gravity tank 18 to cause the check valve 20 to open against the residual air pressure in pressure tank 17 can only be maintained if there is a great enough expansion of the original volume of air under pressure in tank 17 combined with a sufficiently elevated position of gravity tank 18. If a fire should take place on the top floor, and at the same time the pressure tank 17 were filled only one third full of water and two thirds full of air at the full air pressure of, say, seventy-five or more pounds per square inch, while the gravity tank 18 was at such an elevation as would produce but ten pounds pressure at the top floor sprinklers, then it would be impossible for water from the gravity tank to get to the fire at all; for the reisdual air pressure after the pressure tank 17 was emptied of its water would still be sufficient to overcome the head of water in the gravity tank 18. It is for the purpose of overcoming this difficulty that this invention is made and it is applied to the system above described without taking away anything from it.

In accordance with this invention the tank 17 is provided with a relief valve 21 closing a port through a valve seat 22. This relief valve has a rod 23 below and a rod 24 above. The rod 23 has suspended from it a shallow flat copper pan 25 and is guided by a spider 26 if desired. Obviously this copper pan, when submerged, does not support the weight of the water it contains. This weight only acts on the relief valve 21 when the water in the tank has receded from and thus left it unsupported. The pan may be made large enough to cause the valve 21 to open against any amount of residual air pressure due to the tank 17 having emptied itself, in which case the tank will be vented and no pressure will be left to act on the check valve 20 and hence there will be no interference with the flow of water from the gravity tank.

The way in which this is made practical is to provide a double toggle joint 28 pivoted at 29 to a casting 27 and also pivoted to a block 30 slidable on the valve stem. The valve stem is provided with a screw thread at the top having a nut 31 thereon which can be adjusted to readily regulate the device. The centers of the toggle joints 28 are connected by two links 32 with a setting lever 33. This lever has an operating handle, and a rocking cam 34 is located at the bottom of it below the point of pivotal support of the links 32. These parts are mounted in a casing consisting of two portions, one 35 being fixed to a base plate 36 on the top of the tank and which carries the casting 27. The other part 37 of the casing is pivoted on hinges 38 and is capable of rocking over into the dotted line position shown in Fig. 2.

The upper part of the casing portion 37 is provided with a slot 39 for the arm of the lever 33 and through which a latch pin 41 passes and extends down into the casting 27. This latch pin has a ring for receiving a pad lock 40 for locking it in position.

The operation of the device is as follows: When a sprinkler head opens and the pressure is reduced, the pressure behind the check valve 16 being greater than behind the check valve 20, the former opens first. This permits water from the tank 17 under pressure to flow into the supply pipe and it also supplies pressure to the front side of the check valve 20 and keeps that closed. This water from the tank 17 goes through the system under pressure. So far this is the usual operation. But in addition to this the copper pan 25 is left with a weight of water in it when the level of the water outside descends below it, and this pan will sink with that level. It is made large and shallow in order that it may operate in a small space. When it drops it takes with it, of course, the valve 21 and brings the nut 31 down on the block 30. This leaves the toggle lever and link 32 in the full line position shown in Fig. 3. It releases the air pressure in the tank 17 so that now there is no pressure working on the forward side of the check valve 20 and the larger supply of water in the tank 18 is free to pass this check valve and supply the fire extinguisher system throughout the building under sufficient head, and there is no chance of the upper floors being unprotected even for a short time.

After use, the tank having been refilled with water to, say, two thirds of its volume, the apparatus may be reset again as follows: After removing the pad-lock on the pin 41, the portion 37 of the casing is rocked over into the dotted line position in Fig. 2. Now the lever 33 is also rocked over to the dotted line position in Fig. 2 which straightens out the toggle joint and lifts the block 30 against the nut 31 which is adjusted to such a position that the rod 24 and consequently the valve 21, will be lifted until the valve comes to its seat, the nut 31 being raised as shown in Fig. 3. Air is then forced in under pressure, holding the valve to its seat against the weight of the valve stem and pan. Then the operator swings the handle 33 back substantially up to the position shown in Fig. 3, swings the casing portion 37 back to the position shown, applies the pad-lock and the device is set and locked so that it cannot be tampered with under ordinary circumstances.

Although I have illustrated and described only a single form of the invention I am aware of the fact that modifications can be made therein by any person skilled in the art without departing from the scope of the invention as expressed in the claims. Therefore, I do not wish to be limited to all the details of construction or combinations of parts herein shown and described, but—

What I do claim is:—

1. The combination with a supply main extending downwardly, and two branches extending therefrom at the top, of a tank containing water and air under pressure connected with one branch, a gravity supply tank connected with the other branch, check valves in both of said branches for preventing backward flow towards the tanks, a port at the top of the pressure tank, a valve for closing said port, a shallow pan near the bottom of said tank, and a rod connecting said pan with the valve and supporting it therefrom for opening said valve when the level of water therein approaches the bottom of said tank.

2. The combination of a supply main, two branches extending therefrom near the top, a tank containing water and air under pressure connected with one branch, a gravity supply tank connected with the other branch, check valves in both of said branches for preventing backward flow towards the tanks, a port at the top of the pressure tank, a valve for closing said port, a shallow pan near the bottom of said tank, a rod connecting said pan with the valve and supporting it therefrom, whereby said valves will open automatically when the level of water therein approaches the bottom of said tank, and means above the tank for setting the valve in closed position.

3. The combination with a supply main, a tank containing water and air under pressure connected with said main, and a gravity supply tank connected with the main, of a port in the pressure tank, a valve for closing said port, a shallow pan near the bottom of said pressure tank, a rod connecting said pan with the valve and supporting it therefrom, means on the outside of said tank for setting the valve in closed position, and means for holding the setting means locked.

4. The combination with a supply main extending downwardly, two branches extending therefrom at the top, a tank containing water and air under pressure connected with one branch, and a gravity supply tank connected with the other branch, of a port at the top of the pressure tank, a valve for closing said port, a rod or stem extending out through the port and connected with said valve, a block slidable thereon, a toggle lever having one end pivoted to a stationary part and the other to said block, means adjustably mounted on the valve stem in position to receive the pressure from said block when the toggle lever is operated, and means for operating the toggle lever to move the valve up and down 5 The combination with a supply main, a tank containing water and air under pressure connected with said main, a gravity supply tank connected with the main, the pressure tank having a vent port, a valve for closing said port, and means in the tank for opening said valve when the level of water therein approaches the bottom of said tank, of a rod or stem extending out through the port and connected with said valve, a block slidable thereon, a toggle lever having one end pivoted to the valve stem and the other to said block, means adjustably mounted on the valve stem in position to receive the pressure from said block when the toggle lever is operated, an operating lever pivotally connected with the center of the toggle lever and having a rolling support, whereby when the operating lever is rolled over away from the toggle the toggle will be straightened out and the valve lifted to close it.

6. The combination with a supply main, a tank containing water and air under pressure connected therewith, a gravity supply tank connected with the main, and two check valves for preventing backward flow towards the tanks, the pressure tank having a relief port, of a valve for closing said port, a shallow pan near the bottom of said tank, a rod connecting said pan with the valve and supporting it therefrom, means on the outside of said tank for setting the valve in closed position, and means for holding the setting means locked, the last named means comprising a casing having a fixed part and a movable part in which said operating means are located, and means for locking the two parts together.

7. The combination with a tank containing water and air under pressure having a relief port, of a valve for closing said port, a shallow pan near the bottom of said tank, a rod connecting said pan with the valve and supporting it therefrom, means for setting the valve in closed position, and means for holding the setting means locked.

In testimony whereof I have hereunto affixed my signature.

LANCE W. STAUGHTON.